(12) United States Patent
Silverbrook et al.

(10) Patent No.: US 6,566,858 B1
(45) Date of Patent: May 20, 2003

(54) CIRCUIT FOR PROTECTING CHIPS AGAINST IDD FLUCTUATION ATTACKS

(75) Inventors: Kia Silverbrook, Sydney (AU); Simon Robert Walmsley, Sydney (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/112,763

(22) Filed: Jul. 10, 1998

(51) Int. Cl.[7] ............................................. G01R 35/00
(52) U.S. Cl. ................................................. 324/158.1
(58) Field of Search ................................ 324/763, 248, 324/613, 158.1; 73/379, 664, 116

(56) References Cited

U.S. PATENT DOCUMENTS

| | | | | |
|---|---|---|---|---|
| 4,495,560 A | * | 1/1985 | Sugimoto et al. | 73/116 |
| 4,771,276 A | * | 9/1988 | Parks | 340/712 |
| 5,095,270 A | * | 3/1992 | Ludeke | 324/248 |
| 5,804,975 A | * | 9/1998 | Alers et al. | 324/613 |
| 5,872,849 A | * | 2/1999 | Sudia | 380/49 |

OTHER PUBLICATIONS

Telecommunicatins media.*

* cited by examiner

*Primary Examiner*—Kamand Cuneo
*Assistant Examiner*—Jimmy Nguyen

(57) ABSTRACT

A method of providing for resistance to attack by monitoring of an integrated circuit by means of monitoring $I_{dd}$ current changes. The method comprises the step of including a spurious noise generation circuit as part of the integrated circuit, to increase the Signal to Noise Ratio in the $I_{dd}$ signal and obscure meaningful information.

9 Claims, 1 Drawing Sheet

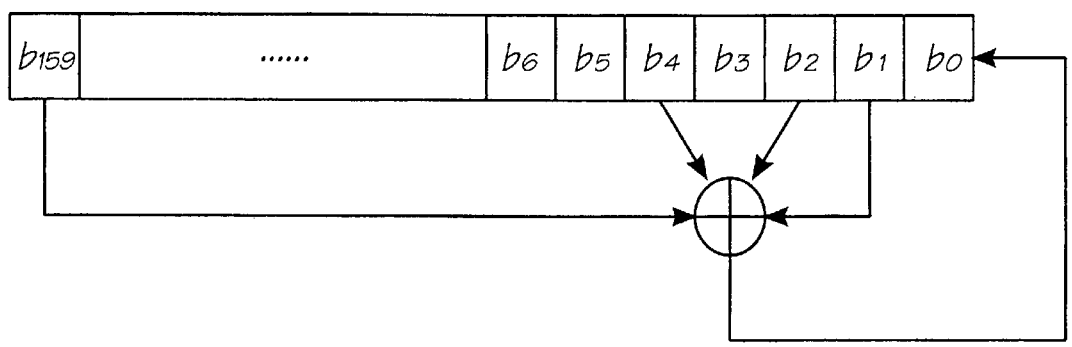

CIRCUIT FOR PROTECTING CHIPS AGAINST IDD FLUCTUATION ATTACKS

CROSS REFERENCES TO RELATED APPLICATIONS

The following co-pending U.S. patent applications, identified by their U.S. patent application serial numbers. (USSN) and Docket numbers (in brackets), were filed simultaneously to the present application on Jul. 10, 1998, and are hereby incorporated by cross-reference:

| | | | |
|---|---|---|---|
| 09/113,060 (ART01) | 09/113,070 (ART02) | 09/113,073 (ART03) | 09/112,748 (ART04) |
| 09/112,747 (ART06) | 09/112,776 (ART07) | 09/112,750 (ART08) | 09/112,746 (ART09) |
| 09/112,743 (ART10) | 09/112,742 (ART11) | 09/112,741 (ART12) | 09/112,740 (ART13) |
| 09/112,739 (ARTI5) | 09/113,053 (ART16) | 09/112,738 (ART17) | 09/113,067 (ART18) |
| 09/113,063 (ART19) | 09/113,069 (ART20) | 09/112,744 (ART21) | 09/113,058 (ART22) |
| 09/112,777 (ART24) | 09/113,224 (ART25) | 09/112,804 (ART26) | 09/112,805 (ART27) |
| 09/113,072 (ART28) | 09/112,785 (ART29) | 09/112,797 (ART30) | 09/112,796 (ART31) |
| 09/113,071 (ART32) | 09/112,824 (ART33) | 09/113,090 (ART34) | 09/112,823 (ART38) |
| 09/113,222 (ART39) | 09/112,786 (ART42) | 09/113,051 (ART43) | 09/112,782 (ART44) |
| 09/113,056 (ART45) | 09/113,059 (ART46) | 09/113,091 (ART47) | 09/112,753 (ART48) |
| 09/113,055 (ART50) | 09/113,057 (ART51) | 09/113,054 (ART52) | 09/112,752 (ART53) |
| 09/112,759 (ART54) | 09/112,757 (ARTS6) | 09/112,758 (ART57) | 09/113,107 (ART58) |
| 09/112,829 (ART59) | 09/112,792 (ART60) | 09/112,791 (ART61) | 09/112,790 (ART62) |
| 09/112,789 (ART63) | 09/112,788 (ART64) | 09/112,795 (ART65) | 09/112,749 (ART66) |
| 09/112,784 (ART68) | 09/112,783 (ART69) | 09/112,781 (DOT01) | 09/113,052 (DOT02) |
| 09/112,834 (Fluid01) | 09/113,103 (Fluid02) | 09/113,101 (Fluid03) | 09/112,751 (IJ01) |
| 09/112,787 (IJ02) | 09/112,802 (IJ03) | 09/112,803 (IJ04) | 09/113,097 (IJ05) |
| 09/113,099 (IJ06) | 09/113,084 (IJ07) | 09/113,066 (IJ08) | 09/112,778 (IJ09) |
| 09/112,779 (IJ10) | 09/113,077 (IJ11) | 09/113,061 (IJ12) | 09/112,818 (IJ13) |
| 09/112,816 (IJ14) | 09/112,772 (IJ15) | 09/112,819 (IJ16) | 09/112,815 (IJ17) |
| 09/113,096 (IJ18) | 09/113,068 (1J19) | 09/113,095 (IJ20) | 09/112,808 (IJ21) |
| 09/112,809 (IJ22) | 09/112,780 (IJ23) | 09/113,083 (IJ24) | 09/113,121 (IJ25) |
| 09/113,122 (IJ26) | 09/112,793 (IJ27) | 09/112,794 (IJ28) | 09/113,128 (IJ29) |
| 09/113,127 (IJ30) | 09/112,756 (IJ31) | 09/112,755 (IJ32) | 09/112,754 (IJ33) |
| 09/112,811 (IJ34) | 09/112,812 (IJ35) | 09/112,813 (IJ36) | 09/112,814 (IJ37) |
| 09/112,764 (IJ38) | 09/112,765 (IJ39) | 09/112,767 (IJ40) | 09/112,768 (IJ41) |
| 09/112,807 (IJ42) | 09/112,806 (IJ43) | 09/112,820 (IJ44) | 09/112,821 (IJ45) |
| 09/112,822 (IJM01) | 09/112,825 (1JM02) | 09/112,826 (IJM03) | 09/112,827 (IJM04) |
| 09/112,828 (IJM05) | 09/113,111 (IJM06) | 09/113,108 (IJM07) | 09/113,109 (IJM08) |
| 09/113,123 (IJM09) | 09/113,114 (IJM10) | 09/113,115 (IJM11) | 09/113,129 (1JM12) |
| 09/113,124 (IJM13) | 09/113,125 (IJM14) | 09/113,126(IJM15) | 09/113,119 (IJM16) |
| 09/113,120 (IJM17) | 09/113,221 (IJMI8) | 09/113,116 (IJM19) | 09/113,118 (IJM20) |
| 09/113,117 (IJM21) | 09/113,113 (IJM22) | 09/113,130 (IJM23) | 09/113,110 (IJM24) |
| 09/113,112 (IJM25) | 09/113,087 (IJM26) | 09/113,074 (IJM27) | 09/113,089 (IJM28) |
| 09/113,088 (IJM29) | 09/112,771 (IJM30) | 09/112,769 (IJM31) | 09/112,770 (IJM32) |
| 09/112,817 (IJM33) | 09/113,076 (IJM34) | 09/112,798 (IJM35) | 09/112,801 (IJM36) |
| 09/112,800 (IJM37) | 09/112,799 (IJM38) | 09/113,098 (IJM39) | 99/112,833 (IJM40) |
| 09/112,832 (IJM41) | 09/112,831 (IJM42) | 09/112,830 (IJM43) | 09/112,836 (IJM44) |
| 09/112,835 (JM45) | 09/113,102 (IR01) | 09/113,106 (IR02) | 09/113,105 (IR04) |
| 09/113,104 (IR05) | 09/112,810 (IR06) | 09/112,766 (IR10) | 09/113,085 (IR12) |
| 09/113,086 (IR13) | 09/113,094 (IR14) | 09/112,760 (IR16) | 09/112,773 (IR17) |
| 09/112,774 (IR18) | 09/112,775 (IR19) | 09/112,745 (IR20) | 09/113,092 (R21) |
| 09/113,100 (MEMS02) | 09/113,093 (MEMS03) | 09/113,062 (MEMS04) | 09/113,064 (MEMS05) |
| 09/113,082 (MEMS06) | 09/113,081 (MEMS07) | 09/113,080 (MEMS09) | 09/113,079 (MEMS10) |
| 09/113,065 (MEMS11) | 09/113,078 (MEMS12) | 09/113,075 (MEMS13). | |

STATEMENT REGARDING FEDERALLY SPONSORED RESEARCH OR DEVELOPMENT

Not applicable.

FIELD OF THE INVENTION

The present invention relates to tamper proof integrated circuit devices.

BACKGROUND OF THE INVENTION

There is a fluctuation in current whenever an integrated circuit register change state. If there is a high enough signal to noise ratio, it is possible for an attacker of a tamper proof security system to monitor the difference in a standard $I_{dd}$ current line that may occur when programming over either a high or a low bit. The change in $I_{dd}$ can reveal information about keys or data. This is obviously undesirable.

SUMMARY OF THE INVENTION

It is an object of the present invention to provide a system resistant to attack by means of monitoring fluctuations in current lines.

In accordance with a first aspect of the present invention there is provided a method of providing for resistance to attack of an integrated circuit by means of monitoring current changes in a current signal in the integrated circuit, said method comprising the step of including a spurious noise generation circuit as part of said integrated circuit for emitting electromagnetic noise and reducing Signal to Noise Ratio to obscure information in the current signal that is meaningful for the attack.

The noise generation circuit can comprises a random number generator such as a LFSR (Linear Feedback Shift Register).

BRIEF DESCRIPTION OF THE DRAWING

Notwithstanding any ether forms which may fall within the scope of the present invention, preferred forms of the invention will now be described, by way of example only, with reference to the accompanying drawing which illustrates a Linear Feedback Shift Register suitable for use with the preferred embodiment.

DESCRIPTION OF PREFERRED AND OTHER EMBODIMENTS

In the preferred embodiment, a LFSR (Linear Feedback Shift Register) is utilized as a noise generator for the purpose of obscuring the $I_{dd}$ fluctuations in a chip. The noise generator can be incorporated on any chip that manipulates secure data. This includes Smart Cards, Authentication chips, electronic keys, and cryptographic equipment. It can also be used as a source of pseudo-random bits for other Tamper Prevention and Detection circuitry. The method of protecting against $I_{dd}$ fluctuation attacks is to decrease the SNR (Signal to Noise Ratio) in the $I_{dd}$ signal. This is accomplished by increasing the amount of circuit noise and decreasing the amount of signal. The Noise Generator circuit described here will cause enough state changes each cycle to obscure any meaningful information in the $I_{dd}$ signal.

The Noise Generator circuit generates continuous circuit noise which interferes with other electromagnetic emissions from the chip's regular activities and adds noise to the $I_{dd}$ signal. Placement of the noise generator is not an issue on the chip due to the length of the emission wavelengths. In a first embodiment the Noise Generator circuit can comprise a maximal period LFSR, where the number of bits in the LFSR is comparable to other state changes in the chip that must be protected. For example, a 32-bit microprocessor can be protected by a 64-bit maximal period LFSR seeded with a non-zero number. The clock used for the noise generator should be running at the maximum clock rate for the chip in order to generate as much noise as possible.

Tap selection of the 64 bits for a maximal-period LFSR (i.e. the LFSR will cycle through all $2^{64}-1$ states, 0 is not a valid state) yields bits 63, 3, 2, 1, and 0, as shown in the drawing. The LFSR is sparse, in that not many bits are used for feedback (only 5 out of 160 bits are used). A suitable LFSR design is shown in the drawing.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The present invention has been developed for utilization in an Artcam device.

We claim:

1. A method of providing for resistance to attack of an integrated circuit by means of monitoring current changes in a current signal in the integrated circuit, said method comprising the step of including as part of said integrated circuit a spurious electromagnetic noise generation circuit for emitting electromagnetic noise and reducing a Signal to Noise Ratio to obscure information in the current signal that is meaningful for the attack.

2. A method as claimed in claim 1 wherein said noise generation circuit comprises a random number generator.

3. A method as claimed in claim 2 wherein said random number generator comprises a LFSR (Linear Feedback Shift Register).

4. A method as claimed in claim 3 further including the step of clocking said LFSR at a maximum clock rate of the integrated circuit.

5. An integrated circuit resistant to attack by monitoring current changes in a current signal in the integrated circuit the integrated circuit including a spurious electromagnetic noise generation circuit for emitting electromagnetic noise and decreasing a Signal to Noise Ratio to obscure information in the current signal that is meaningful for the attack.

6. An integrated circuit as claimed in claim 5 wherein said noise generation circuit comprises a random number generator.

7. An integrated circuit as claimed in claim 6 wherein said random number generator comprises a LFSR (Linear Feedback Shift Register).

8. A method as claimed in claim 3 wherein a number of bits in the LFSR is comparable to other state changes in the integrated circuit that are to be protected from the attack.

9. An integrated circuit as claimed in claim 7 wherein a number of bits in the LFSR is comparable to other state changes in the integrated circuit that are to be protected from the attack.

* * * * *